United States Patent
Carey et al.

(10) Patent No.: US 8,799,873 B2
(45) Date of Patent: Aug. 5, 2014

(54) COLLECTING TRACEPOINT DATA

(75) Inventors: James E. Carey, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 13/468,214

(22) Filed: May 10, 2012

(65) Prior Publication Data
US 2013/0305226 A1 Nov. 14, 2013

(51) Int. Cl.
*G06F 9/44* (2006.01)

(52) U.S. Cl.
USPC ........... 717/130; 717/124; 717/128; 717/129; 717/131

(58) Field of Classification Search
USPC .................................................. 717/128, 127
See application file for complete search history.

(56) References Cited

U.S. PATENT DOCUMENTS

| | | | | |
|---|---|---|---|---|
| 5,121,489 A * | 6/1992 | Andrews | ..................... | 714/38.13 |
| 5,201,044 A * | 4/1993 | Frey et al. | ....................... | 714/20 |
| 5,450,593 A * | 9/1995 | Howell et al. | .................... | 726/21 |
| 5,771,385 A * | 6/1998 | Harper | ........................... | 717/128 |
| 6,961,925 B2 * | 11/2005 | Callahan et al. | .............. | 717/128 |
| 7,047,521 B2 | 5/2006 | Bunnell | | |
| 7,058,928 B2 * | 6/2006 | Wygodny et al. | .............. | 717/128 |
| 7,210,127 B1 * | 4/2007 | Rangachari | ................... | 717/128 |
| 7,810,075 B2 * | 10/2010 | Dostert et al. | ................. | 717/128 |
| 2011/0283270 A1 * | 11/2011 | Gass et al. | ...................... | 717/168 |
| 2011/0289301 A1 * | 11/2011 | Allen et al. | .................... | 712/227 |

OTHER PUBLICATIONS

"Dynamic System Tracing With KPTrace | STLinux", www.stlinux.com [online] 2012, 3 pp., [accessed online Jan. 31, 2012], URL: http://www.stlinux.com/devel/traceprofile/kptrace.

* cited by examiner

*Primary Examiner* — Lewis A Bullock, Jr.
*Assistant Examiner* — Mark Gooray
(74) *Attorney, Agent, or Firm* — Biggers Kennedy Lenart Spraggins LLP

(57) ABSTRACT

Collecting tracepoint data includes: maintaining, by a log handler, a list of a plurality of tracepoints and each tracepoint's parameters, the values of the parameters defining, for a tracepoint, information to be stored when an application encounters the tracepoint; encountering, by an application, a tracepoint; determining, responsive to the encounter by the log handler, whether the tracepoint is linked to a different tracepoint; and if the tracepoint is linked to a different tracepoint, determining, by the log handler, whether to modify values of the parameters for the different tracepoint and executing the different tracepoint.

18 Claims, 5 Drawing Sheets

COLLECTING TRACEPOINT DATA

BACKGROUND OF THE INVENTION

1. Field of the Invention

The field of the invention is data processing, or, more specifically, methods, apparatus, and products for collecting tracepoint data.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As computers and software become more advance, the need to collect execution data, error data, and other operational data has also increased. To collect some forms of data, tracepoints may be employed for applications. A tracepoint, as the term is used in this specification, is an indication in an application that, when encountered, triggers a particular action, such as data collection. In many implementations, a tracepoint is similar to a debugger breakpoint, except that encountering a breakpoint typically halts execution of the underlying application while encountering a tracepoint generally does not. Tracepoints are typically only associated with a single, predefined action or set of actions prior to run-time. Further, multiple tracepoints in a single application have no relation to one another. That is, encountering one tracepoint does not affect the action carried out when subsequently encountering a different tracepoint.

SUMMARY OF THE INVENTION

Methods, apparatus, and products for collecting tracepoint data are disclosed in this specification. Such collection of tracepoint data includes: maintaining, by a log handler, a list of a plurality of tracepoints and each tracepoint's parameters, the values of the parameters defining, for a tracepoint, information to be stored when an application encounters the tracepoint; encountering, by an application, a tracepoint; determining, responsive to the encounter by the log handler, whether the tracepoint is linked to a different tracepoint; and if the tracepoint is linked to a different tracepoint, determining, by the log handler, whether to modify values of the parameters for the different tracepoint and executing the different tracepoint.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
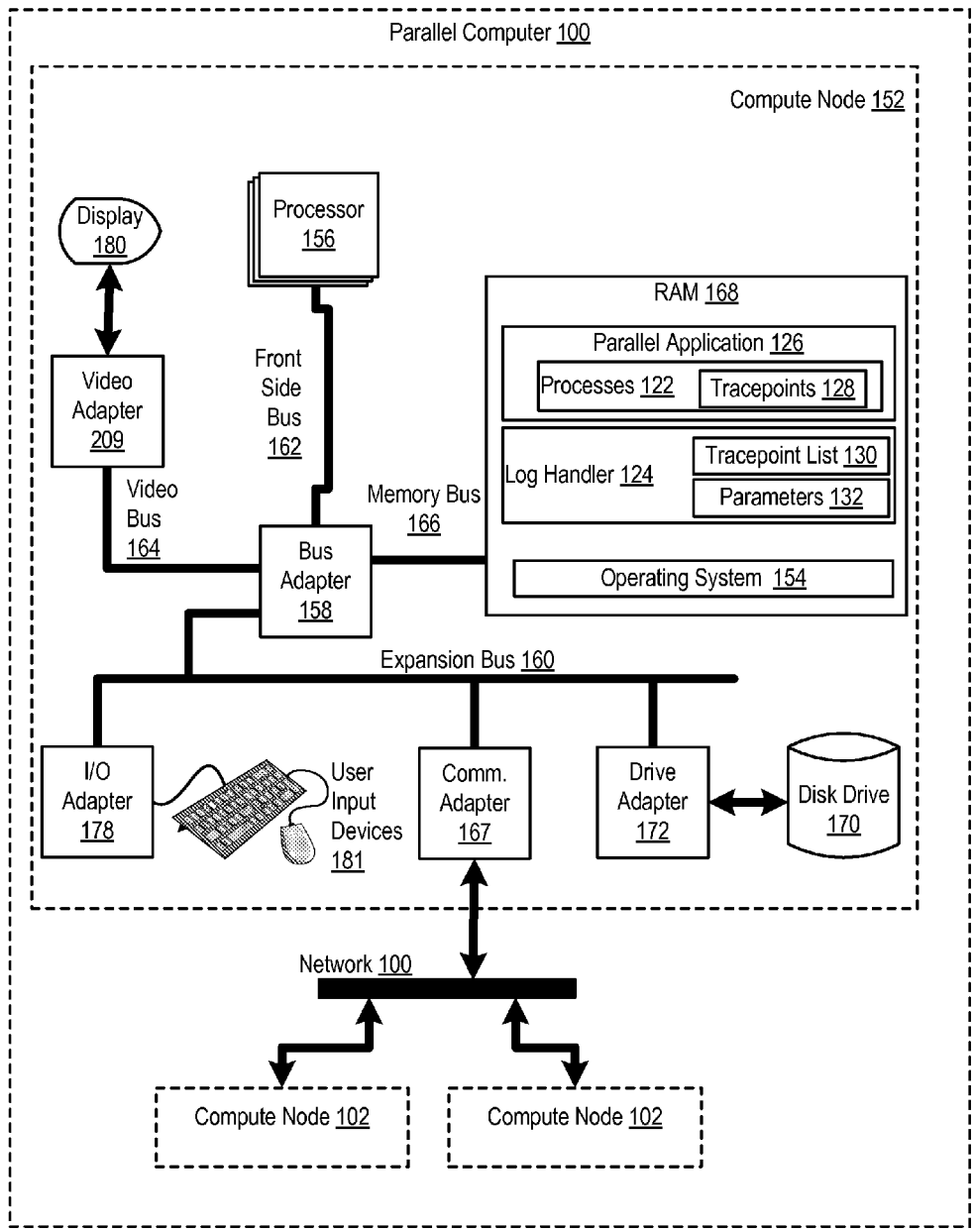
FIG. 1 sets forth a block diagram of a parallel computer for collecting tracepoint data according to embodiments of the present invention.

Exemplary methods, apparatus, and products for collecting tracepoint data in accordance with the present invention are described with reference to the accompanying drawings, beginning with FIG. 1. FIG. 1 sets forth a block diagram of a parallel computer (100) for collecting tracepoint data according to embodiments of the present invention. The parallel computer of FIG. 1 includes several compute nodes (152, 102), each of which is generally is generally implemented as a computer, that is, with automated computing machinery. Although each of the compute nodes (152, 102) in the example of FIG. 1 may be configured to collect tracepoint data in accordance with embodiments of the present invention, for ease of explanation, one compute node (152) is described here in detail. Readers of skill in the art will recognize that many of the same components in and operations of the compute node (152) described here, may also be included in and carried out by the other compute nodes (102).

The example compute node (152) is configured for collecting tracepoint data according to embodiments of the present invention. The compute node (152) of FIG. 1 includes at least one computer processor (156) or 'CPU' as well as random access memory (168) ('RAM') which is connected through a high speed memory bus (166) and bus adapter (158) to processor (156) and to other components of the compute node (152).

Stored in RAM (168) is a parallel application (126), an example of an application which may be segmented into a plurality of parallel processes (122) for execution, in parallel, on multiple compute nodes. The parallel application (126) includes one or more tracepoints. When encountered during execution of the parallel application (126), each tracepoint (128) causes a log handler (124) to retrieve and store in a log various data. Such logging of data may be carried out during a debug session of an application or in a non-debug environment. The data retrieved by the log handler in response to an encountered tracepoint may be tracepoint-specific, that is, different for each tracepoint in the parallel application (126). The various data to be retrieved may be specified by a set of parameters (132) associated with the tracepoint (128).

The log handler (124) in the example of FIG. 1 is configured for collecting tracepoint data according to embodiments of the present invention. To that end, the example log handler (124) maintains a list of the tracepoints (128) and each tracepoint's parameters (132). The values of the parameters define, for a tracepoint, information to be stored when the application (126) encounters the tracepoint.

Upon the application (126) encountering a tracepoint, the log handler (124) determines whether the tracepoint is linked to a different tracepoint. A tracepoint may be linked to another tracepoint by an association specified by a user or developer of the parallel application. In fact, the term 'linked' as used in this description means a specified association. Such an association may be specified in the list (130) of tracepoints maintained by the log handler (124) or in some other data structure accessible by the log handler (124).

If the tracepoint is linked to a different tracepoint, the log handler (124) determines whether to modify values of the parameters (132) for the different tracepoint. The tracepoint list (130), or a separate ruleset, may specify conditions for which tracepoint parameters (132) values are to be modified. Such a condition, for example, may be the requisite current value of the program counter, a requisite minimum number of exceptions or errors during execution, a requisite current value of a particular variable, and so on as will occur to readers of skill in the art.

If the conditions are met, the log handler (124) determines that the values of the different tracepoint's parameters are to be modified and modifies the values accordingly. In embodiments in which the different tracepoint is included in a parallel processor or separate instance of the application executing on a separate compute node (102) or in a separate run-time environment, the log handler (124) may inform a separate log handler of the modifications to be made. Upon the application encountering the different tracepoint, the log handler (124) collects data in accordance with the modified parameter values.

In this way, a software developer may fine tune, dynamically during run-time, the data collected when encountering tracepoints. A developer, for example, may prefer the log handler to store values of one data structure responsive to an encounter of a tracepoint at line 100 of source code during typical execution of the application and may prefer the log handler to store values of a different data structure responsive to an encounter of the tracepoint at line 100 under other conditions—other conditions represented by an encounter of a tracepoint at line 50 of the source code. By configuring the log handler to modify parameter values of the tracepoint at line 100 to retrieve the different data structure values upon an encounter of the line 50 tracepoint, the developer receives more useful and accurate data from an encounter of the tracepoint at line 100.

Readers of skill in the art will recognize that the term 'different tracepoint' may refer to a completely separate tracepoint—a tracepoint at a separate line of source code or invoking separate actions. In some embodiments, however, the 'different tracepoint' may also refer to a separate instance of the same tracepoint. Consider, for example, a first instance of an application executing on a first compute node (152) and a second instance of the same application executing on a second compute node. Further consider that a tracepoint at line 100 of source code is included in the application and the first instance of the application encounters the tracepoint at line 100 prior to second instance encountering the same tracepoint. In such an example, the term 'different tracepoint' may refer to the tracepoint at line 100 in the second instance of the application.

Although the example of FIG. 1 is described with respect to a parallel application (126) with a plurality of parallel processes (122) executing on several compute nodes (152, 102), readers of skill in the art will recognize that collecting tracepoint data in accordance with embodiments of the present invention may apply to any type of application, parallel or otherwise. In an example of non-parallel application that includes multiple tracepoints—say, at line 100 and line 200—encountering the tracepoint at line 100 may prompt parameters for the tracepoint at line 200 to be modified.

Also stored in RAM (168) is an operating system (154). Operating systems useful collecting tracepoint data according to embodiments of the present invention include UNIX™, Linux™, Microsoft XP™, Microsoft Windows 7™, AIX™, IBM's i5/OS™, and others as will occur to those of skill in the art. The operating system (154), parallel application (126), and the log handler (124) in the example of FIG. 1 are shown in RAM (168), but many components of such software are typically stored in non-volatile memory also, such as, for example, on a disk drive (170).

The compute node (152) of FIG. 1 includes disk drive adapter (172) coupled through expansion bus (160) and bus adapter (158) to processor (156) and other components of the compute node (152). Disk drive adapter (172) connects non-volatile data storage to the compute node (152) in the form of disk drive (170). Disk drive adapters useful in compute nodes for collecting tracepoint data according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art. The example compute node (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example compute node (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary compute node (152) of FIG. 1 includes a communications adapter (167) for data communications with other compute nodes (102) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one compute node sends data communications to another compute node, directly or through a data communications network. Examples of communications adapters useful for collecting tracepoint data according to embodiments of the present invention include modems for wired dial-up communications, Ethernet (IEEE 802.3) adapters for wired data communications, and 802.11 adapters for wireless data communications.

The arrangement of servers and other devices making up the exemplary parallel computer (100) illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
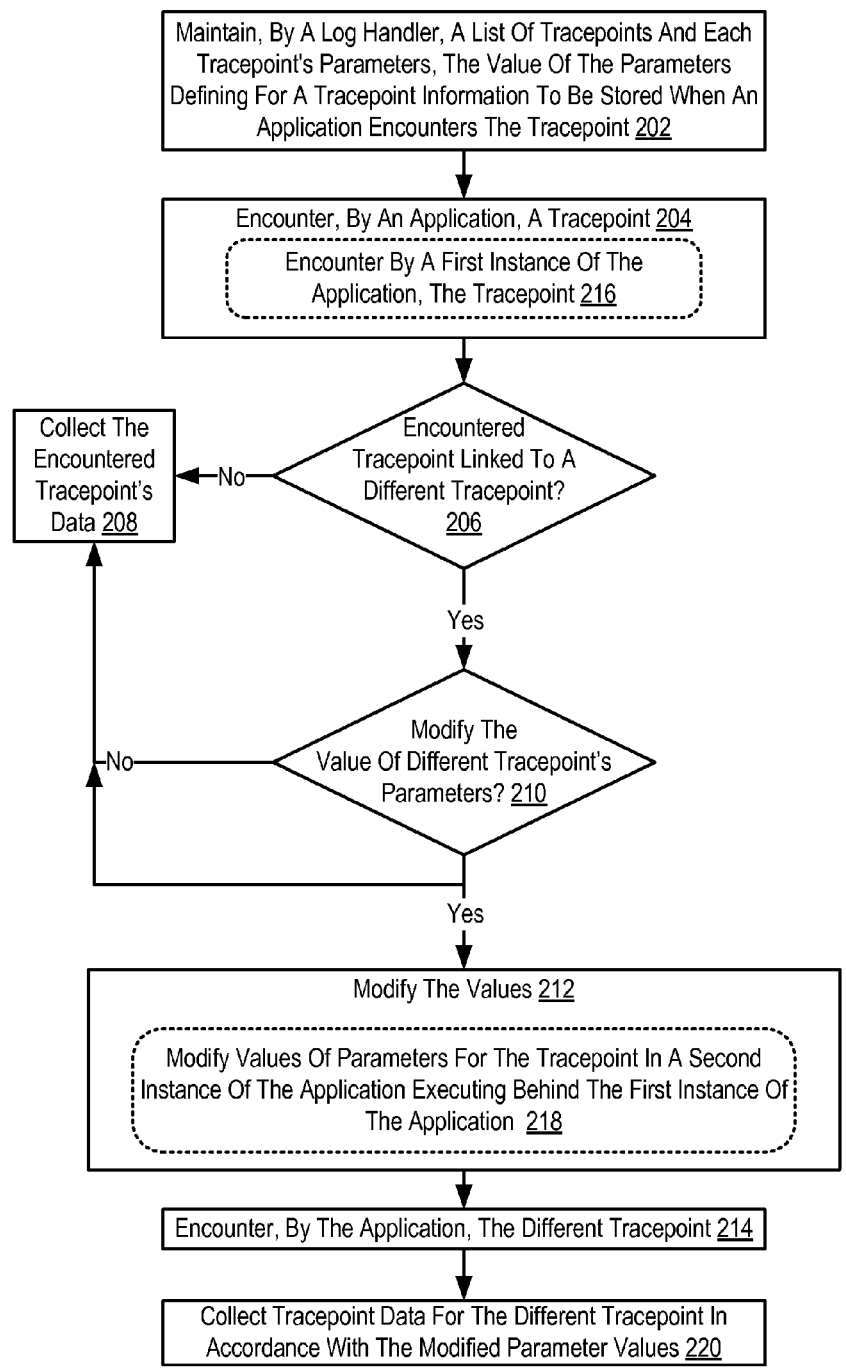
FIG. 2 sets forth a flow chart illustrating an exemplary method for collecting tracepoint data according to embodiments of the present invention.

For further explanation, FIG. 2 sets forth a flow chart illustrating an exemplary method for collecting tracepoint data according to embodiments of the present invention. The method of FIG. 2 may be carried out in a parallel computer similar to that described in the example of FIG. 1 or in a non-parallel computer.

The method of FIG. 2 includes maintaining (202), by a log handler, a list of a plurality of tracepoints and each tracepoint's parameters. In the example of FIG. 2, the values of the parameters define, for a tracepoint, information to be stored when an application encounters the tracepoint. Maintaining (202) a list of a plurality of tracepoints and each tracepoint's parameters may be carried out in variety of ways, including for example by storing the list of tracepoints and tracepoint parameters in a data structure. Such a list may also be provided to the log handler at load time of the application. The list may be generated by a debugger or integrated development environment (IDE) at development time and stored as a library or other file included as part of the application executable.

The method of FIG. 2 also includes encountering (204), by an application, a tracepoint and determining (206), by the log handler, whether the tracepoint is linked to a different tracepoint. Determining (206) whether the tracepoint is linked to a different tracepoint may be carried out by inspecting the list of tracepoints and determining whether the encountered tracepoint is associated in the list with any other tracepoints.

If the tracepoint is linked to a different tracepoint, the method of FIG. 2 continues by determining (210), by the log handler, whether to modify values of the parameters for the different tracepoint. Determining (210) whether to modify values of the parameters for the different tracepoint may be carried out in various ways including, for example, inspecting a ruleset specifying conditions in which values are to be modified. If the conditions are met, the log handler makes a determination to modify the values of the parameters of the different tracepoint. If the conditions are not met, the log handler makes a determination to not modify the values of the parameters of the different tracepoint and continues to collect (208) the encountered tracepoint's data.

If the log hander determines to modify the values of the parameters for the different tracepoint, the method of FIG. 2 continues by modifying (210), by the log handler, the values of the different tracepoint. Modifying (210) the values of the different tracepoint may be carried out by replacing original values with modified values in a data structure containing parameter values for the different tracepoint. In an embodiment in which the different tracepoint is located in an application executing a separate run-time environment or in a parallel process executing on a separate compute node, the log handler may request the modifications to be made by another log handler in the separate run-time environment or separate compute node.

The method of FIG. 2 continues by encountering (214) the different tracepoint by the application and collecting (220) tracepoint data for the different tracepoint in accordance with the modified parameter values.

The example of FIG. 2 also illustrates—in dashed lines— another embodiment of several of the method steps. For example, in the method of FIG. 2, encountering (204) a tracepoint may include encountering (216) by a first instance of the application, the tracepoint and modifying (210) the values of the different tracepoint may include modifying (218) values of parameters for the tracepoint in a second instance of the application executing behind the first instance of the application. The phrase 'executing behind' in this example means 'behind in time.' Here, encountering a tracepoint in a first instance of the application enables the log handler to modify values of the parameters of the same tracepoint in the second instance of the application. As described above, the 'different tracepoint' in this example is, in fact, the same tracepoint, albeit in a separate instance of the same application.

Figure 3:
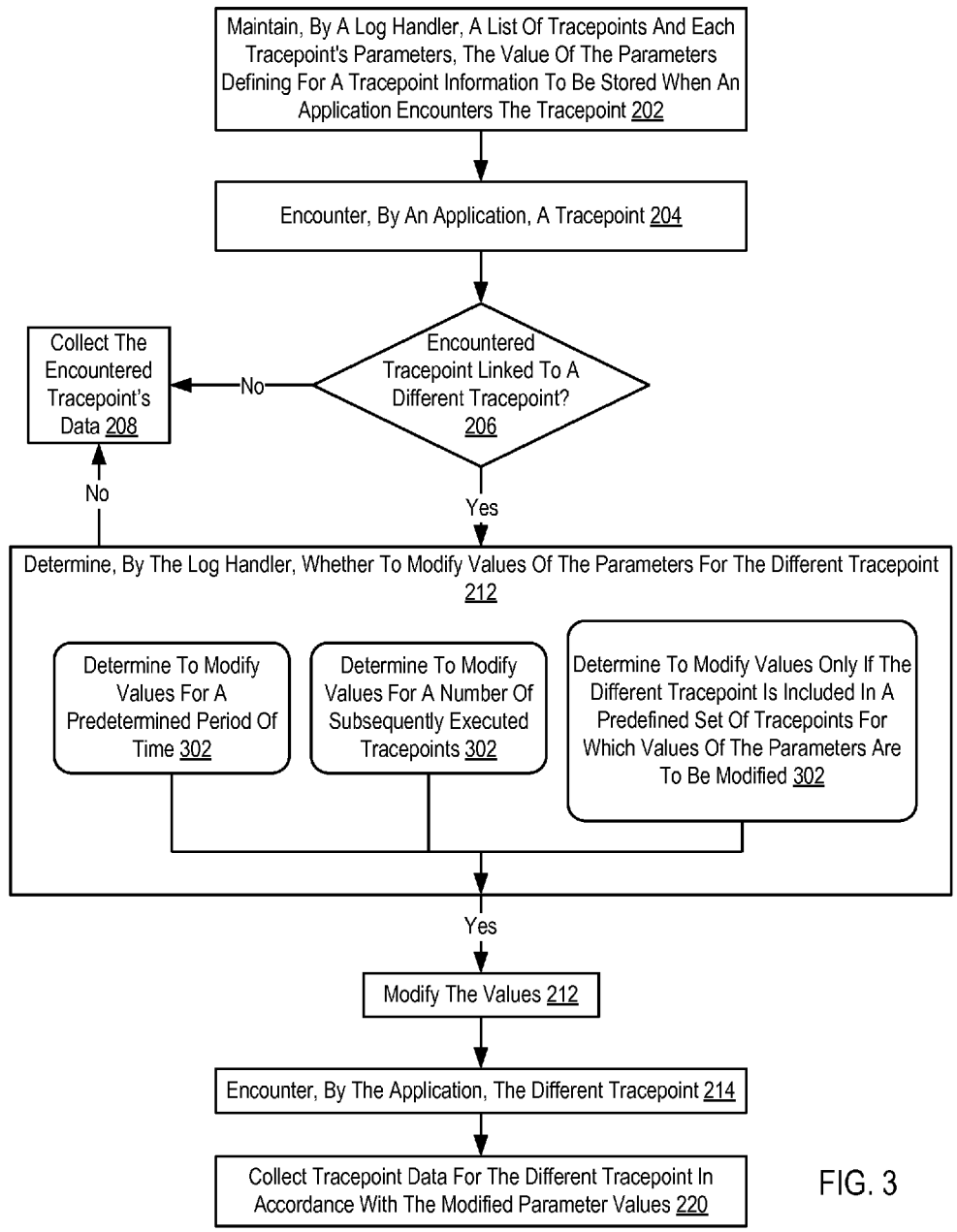
FIG. 3 sets forth a flow chart illustrating a further exemplary method for collecting tracepoint data according to embodiments of the present invention.

For further explanation, FIG. 3 sets forth a flow chart illustrating a further exemplary method for collecting tracepoint data according to embodiments of the present invention. The method of FIG. 3 is similar to the method of FIG. 2 in that the method of FIG. 3 also includes maintaining (202) a list of a plurality of tracepoints and each tracepoint's parameters; encountering (204) a tracepoint; determining (206) whether the tracepoint is linked to a different tracepoint; determining (210) whether to modify values of the parameters for the different tracepoint; modifying (212) the values of the different tracepoint; and upon encountering (214) the different tracepoint by the application, collecting (220) tracepoint data for the different tracepoint in accordance with the modified parameter values.

The method of FIG. 3 differs from the method of FIG. 2, however, in that in the method of FIG. 3, determining (212) whether to modify values of the parameters for the different tracepoint includes determining (302) to modify values for a predetermined period of time. That is, the log handler may modify the values of the different tracepoint and upon expiration of the predetermined period of time, return the values of the parameters to their original state.

Also in the method of FIG. 3, determining (212) whether to modify values of the parameters for the different tracepoint may include determining (302) to modify values for a number of subsequently encountered tracepoints. That is, the log handler may modify the values of the different tracepoint until a predefined number of tracepoints are encountered and then return the values of the parameters to their original state.

Also in the method of FIG. 3, determining (212) whether to modify values of the parameters for the different tracepoint may include determining (302) to modify values only if the different tracepoint is included in a predefined set of tracepoints for which values of the parameters are to be modified. In a debug session, for example, a user may at load time of an application specify tracepoints for which values may modify and tracepoints for which values may not be modified, regardless of whether the tracepoints are linked.

Figure 4:
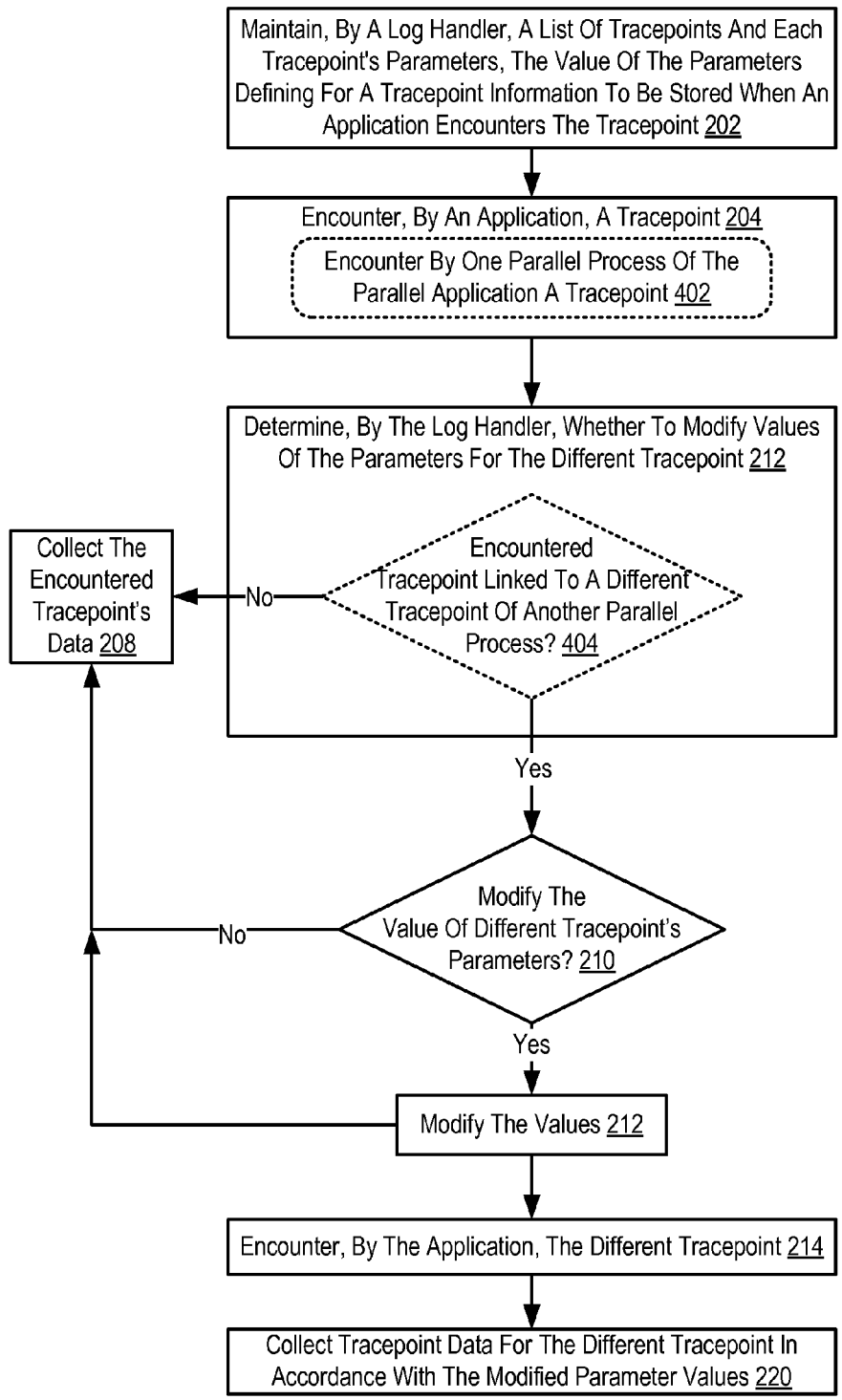
FIG. 4 sets forth a flow chart illustrating a further exemplary method for collecting tracepoint data according to embodiments of the present invention.

For further explanation, FIG. 4 sets forth a flow chart illustrating a further exemplary method for collecting tracepoint data according to embodiments of the present invention. The method of FIG. 4 is similar to the method of FIG. 2 in that the method of FIG. 4 also includes maintaining (202) a list of a plurality of tracepoints and each tracepoint's parameters; encountering (204) a tracepoint; determining (206) whether the tracepoint is linked to a different tracepoint; determining (210) whether to modify values of the parameters for the different tracepoint; modifying (212) the values of the different tracepoint; and upon encountering (214) the different tracepoint by the application, collecting (220) tracepoint data for the different tracepoint in accordance with the modified parameter values.

The method of FIG. 4 differs from the method of FIG. 2, however, in that in the method of FIG. 4, the application is implemented as a parallel application, where the parallel application includes a plurality of processes. Such processes may execute in parallel on a single computer or compute node, or may execute in parallel on separate compute nodes. In the method of FIG. 4, encountering (204) a tracepoint includes encountering (402) by one parallel process of the parallel application a tracepoint and determining (212) whether the tracepoint is linked to a different tracepoint includes determining (404) whether the tracepoint is linked to a different tracepoint of another parallel process. If the tracepoint is linked to a different tracepoint of another parallel process and the log handler determines (210) to modify the values of the parameters of the different tracepoint of the other parallel process, modifying (212) the values may be carried out by requesting, by the log handler, the modifications be carried out by another log handler—a log handler supporting tracepoint data collection for the other parallel process.

Figure 5:
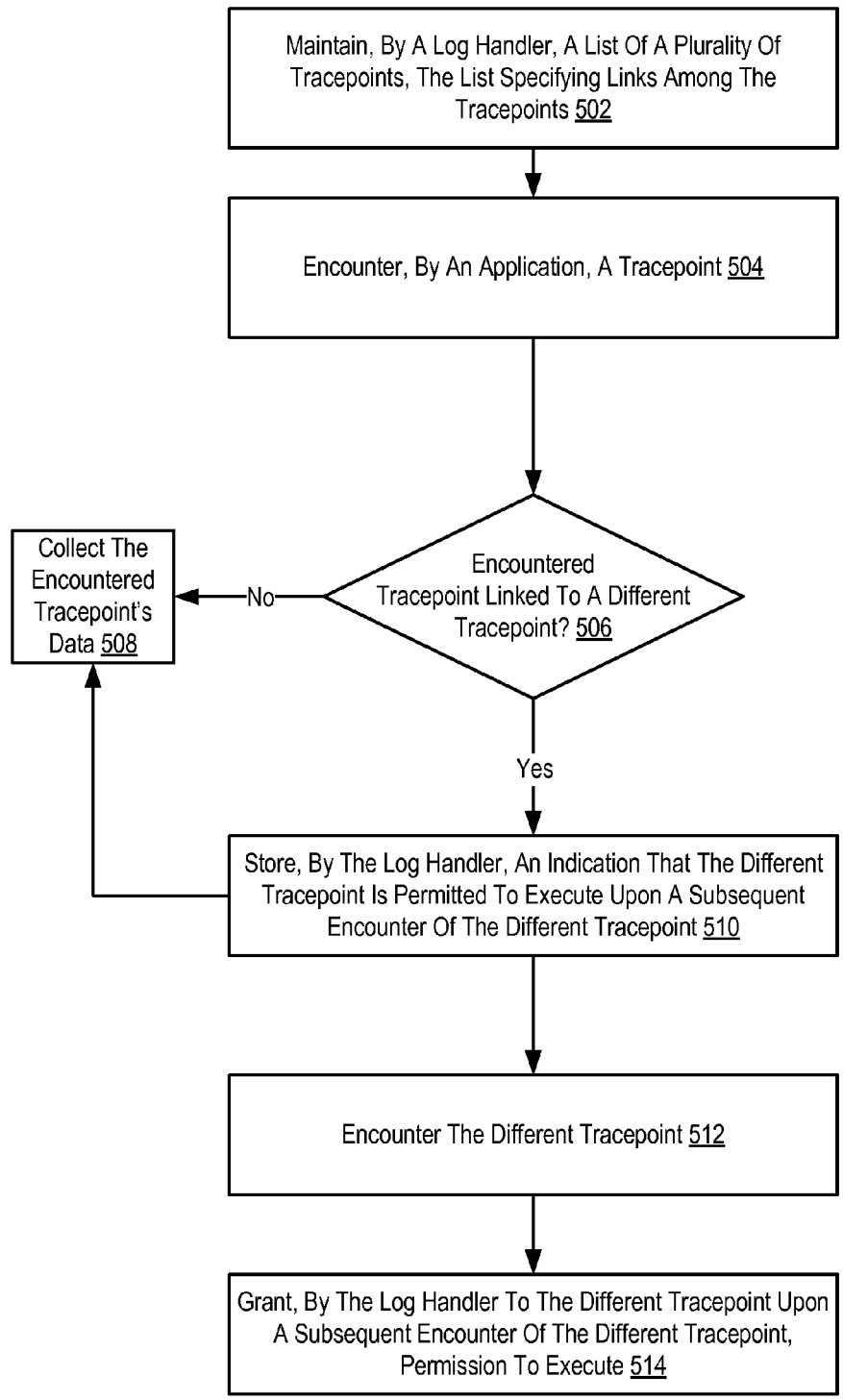
FIG. 5 sets forth a flow chart illustrating a further exemplary method for collecting tracepoint data according to embodiments of the present invention

The methods of FIGS. 2-4 set forth various embodiments in which the log handler is configured to modify parameters for linked tracepoints. In other embodiments, however, the log handler may be configured to grant or deny permission to tracepoints to execute. In such embodiments, an encountered tracepoint effectively 'checks-in' with the log handler, requesting permission to execute. The log handler grants or denies such execution. In such an embodiment, rather than modifying parameters of linked tracepoints, the log handler may be configured to grant execution of a linked tracepoint in dependence upon the encounter of another tracepoint. For further explanation, therefore, FIG. 5 sets forth a flow chart illustrating a further exemplary method for collecting tracepoint data according to embodiments of the present invention. The method of FIG. 5 includes maintaining (502), by a log handler, a list of a plurality of tracepoints. In the method of FIG. 5, the list specifies links among the tracepoints and the log handler is configured to grant or deny execution to tracepoints. The method of FIG. 5 continues by encountering (504), by an application, a tracepoint. Upon such an encounter, the tracepoint invokes the log handler which will identify whether the tracepoint is permitted to execute. If so, the tracepoint executes and collects data. If not, the tracepoint ends and execution of the application continues.

The method of FIG. 5 also includes determining (506), responsive to the encounter by the log handler in dependence upon the list of the plurality of tracepoints, whether the encountered tracepoint is linked to a different tracepoint. If the encountered tracepoint is not linked to a different tracepoint, the method of FIG. 5 continues by collecting (508) the encountered tracepoint's data. Readers of skill in the art will recognize that in some embodiments, the log handler may deny execution to the encountered tracepoint and no data will be collected.

If the log handler determines that the encountered tracepoint is linked to a different tracepoint, the log handler stores (510) an indication that the different tracepoint is permitted to execute upon a subsequent encounter of the different tracepoint. The log handler, for example, may set a permission flag associated with the linked, different tracepoint in the list of the plurality of tracepoints. In such an embodiment, the log handler may determine whether to grant or deny permission for a tracepoint to execute by inspecting the value of the permission flag for each tracepoint.

The method of FIG. 5 continues by encountering (512) the different tracepoint and granting (514), by the log handler upon the subsequent encounter of the different tracepoint, permission to execute. In this way, an encountering a first tracepoint may cause a second tracepoint to be permitted execution, when that second tracepoint would otherwise be denied permission to execute.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of collecting tracepoint data, the method comprising:
    maintaining, by a log handler, a list of a plurality of tracepoints and each tracepoint's parameters, the values of the parameters representing information to be stored by the log handler when an application encounters the tracepoint;
    encountering, by an application, a tracepoint;
    determining, responsive to the encounter by the log handler, whether the tracepoint is linked by express association to a different tracepoint, the express association specified by a data structure in the log handler;
    if the tracepoint is linked to a different tracepoint:
        determining, by the log handler, whether to modify values of the parameters for the different tracepoint; and
        accessing, by log handler, a ruleset that specifies conditions for which trace point parameter values are to be modified; and
        if the log hander determines to modify the values of the parameters for the different tracepoints in dependence upon the ruleset, modifying, by the log handler, the values of the different tracepoints and, upon encountering the different tracepoint by the application, collecting tracepoint data for the different tracepoint in accordance with the modified parameter values, thereby dynamically modifying the operation of the data collection when encountering tracepoints.

2. The method of claim 1 wherein determining, by the log handler, whether to modify values of the parameters for the different tracepoint further comprises determining to modify values for a predetermined period of time.

3. The method of claim 1 wherein determining, by the log handler, whether to modify values of the parameters for the different tracepoint further comprises determining to modify values for a number of subsequently encountered tracepoints.

4. The method of claim 1 wherein determining, by the log handler, whether to modify values of the parameters for the different tracepoint further comprises determining to modify values only if the different tracepoint is included in a predefined set of tracepoints for which values of the parameters are to be modified.

5. The method of claim 1 further wherein encountering, by an application, a tracepoint further comprises encountering by a first instance of the application, the tracepoint and the method further comprises modifying values of parameters for the tracepoint in a second instance of the application executing behind the first instance of the application.

6. The method of claim 1 wherein:
    the application further comprises a parallel application, the parallel application including a plurality of processes;
    encountering, by an application, a tracepoint further comprises encountering by one parallel process of the parallel application a tracepoint; and
    determining, responsive to the encounter by the log handler, whether the tracepoint is linked to a different tracepoint further comprises determining whether the tracepoint is linked to a different tracepoint of another parallel process.

7. An apparatus for collecting tracepoint data, the apparatus comprising a computer processor, a computer memory operatively coupled to the computer processor, the computer memory having disposed within it computer program instructions that, when executed by the computer processor, cause the apparatus to carry out the steps of:
    maintaining, by a log handler, a list of a plurality of tracepoints and each tracepoint's parameters, the values of the parameters representing information to be stored by the log handler when an application encounters the tracepoint;
    encountering, by an application, a tracepoint;
    determining, responsive to the encounter by the log handler, whether the tracepoint is linked by express association to a different tracepoint, the express association specified by a data structure in the log handler;
    if the tracepoint is linked to a different tracepoint:
    determining, by the log handler, whether to modify values of the parameters for the different tracepoint; and
    accessing, by log handler, a ruleset that specifies conditions for which trace point parameter values are to be modified; and if the log hander determines to modify the values of the parameters for the different tracepoints in dependence upon the ruleset, modifying, by the log handler, the values of the different tracepoints and, upon encountering the different tracepoint by the application, collecting tracepoint data for the different tracepoint in accordance with the modified parameter values, thereby dynamically modifying the operation of the data collection when encountering tracepoints.

8. The apparatus of claim 6 wherein determining, by the log handler, whether to modify values of the parameters for the different tracepoint further comprises determining to modify values for a predetermined period of time.

9. The apparatus of claim 6 wherein determining, by the log handler, whether to modify values of the parameters for the different tracepoint further comprises determining to modify values for a number of subsequently encountered tracepoints.

10. The apparatus of claim 6 wherein determining, by the log handler, whether to modify values of the parameters for the different tracepoint further comprises determining to modify values only if the different tracepoint is included in a predefined set of tracepoints for which values of the parameters are to be modified.

11. The apparatus of claim 6 further wherein encountering, by an application, a tracepoint further comprises encountering by a first instance of the application, the tracepoint and the method further comprises modifying values of parameters for the tracepoint in a second instance of the application executing behind the first instance of the application.

12. The apparatus of claim 6 wherein:
the application further comprises a parallel application, the parallel application including a plurality of processes;
encountering, by an application, a tracepoint further comprises encountering by one parallel process of the parallel application a tracepoint; and
determining, responsive to the encounter by the log handler, whether the tracepoint is linked to a different tracepoint further comprises determining whether the tracepoint is linked to a different tracepoint of another parallel process.

13. A computer program product for collecting tracepoint data, the computer program product disposed upon a computer readable medium wherein the computer program product is not a signal, the computer program product comprising computer program instructions that, when executed, cause a computer to carry out the steps of:
maintaining, by a log handler, a list of a plurality of tracepoints and each tracepoint's parameters, the values of the parameters representing information to be stored by the log handler when an application encounters the tracepoint;
encountering, by an application, a tracepoint;
determining, responsive to the encounter by the log handler, whether the tracepoint is linked by express association to a different tracepoint, the express association specified by a data structure in the log handler;
if the tracepoint is linked to a different tracepoint:
determining, by the log handler, whether to modify values of the parameters for the different tracepoint; and
accessing, by log handler, a ruleset that specifies conditions for which trace point parameter values are to be modified; and
if the log hander determines to modify the values of the parameters for the different tracepoints in dependence upon the ruleset, modifying, by the log handler, the values of the different tracepoints and, upon encountering the different tracepoint by the application, collecting tracepoint data for the different tracepoint in accordance with the modified parameter values, thereby dynamically modifying the operation of the data collection when encountering tracepoints.

14. The computer program product of claim 13 wherein determining, by the log handler, whether to modify values of the parameters for the different tracepoint further comprises determining to modify values for a predetermined period of time.

15. The computer program product of claim 13 wherein determining, by the log handler, whether to modify values of the parameters for the different tracepoint further comprises determining to modify values for a number of subsequently encountered tracepoints.

16. The computer program product of claim 13 wherein determining, by the log handler, whether to modify values of the parameters for the different tracepoint further comprises determining to modify values only if the different tracepoint is included in a predefined set of tracepoints for which values of the parameters are to be modified.

17. The computer program product of claim 13 further wherein encountering, by an application, a tracepoint further comprises encountering by a first instance of the application, the tracepoint and the method further comprises modifying values of parameters for the tracepoint in a second instance of the application executing behind the first instance of the application.

18. The computer program product of claim 13 wherein:
the application further comprises a parallel application, the parallel application including a plurality of processes;
encountering, by an application, a tracepoint further comprises encountering by one parallel process of the parallel application a tracepoint; and
determining, responsive to the encounter by the log handler, whether the tracepoint is linked to a different tracepoint further comprises determining whether the tracepoint is linked to a different tracepoint of another parallel process.

* * * * *